June 8, 1937. F. UNGERER Re. 20,404

PLATE STRAIGHTENING MACHINE

Original Filed March 29, 1934 2 Sheets-Sheet 1

Inventor:
Fritz Ungerer
by Geo. H. Fenwick
Attorney

June 8, 1937. F. UNGERER Re. 20,404

PLATE STRAIGHTENING MACHINE

Original Filed March 29, 1934 2 Sheets-Sheet 2

Inventor:
Fritz Ungerer
by [illegible]
Attorney

Reissued June 8, 1937 Re. 20,404

UNITED STATES PATENT OFFICE 20,404

PLATE STRAIGHTENING MACHINE

Fritz Ungerer, Pforzheim-Protzinger, Germany

Original No. 2,044,373, dated June 16, 1936, Serial No. 717,958, March 29, 1934. Application for reissue October 17, 1936, Serial No. 106,258. In Germany September 25, 1933

4 Claims. (Cl. 153—54)

The straightening of metal sheets, especially the hot straightening with the known plate straightening machines with thin straightening rolls presents difficulties which are overcome to a very great extent by the plate straightening machine hereinafter described.

The novelty of the plate straightening machine according to the invention consists in that the supporting rollers, a pair of which belongs to one supporting point of a straightening roll, are not arranged the one behind the other in the direction in which the sheets pass through the machine, but are mutually displaced.

Two embodiments of the invention are illustrated by way of example in the accompanying drawings in which.

Figure 1:
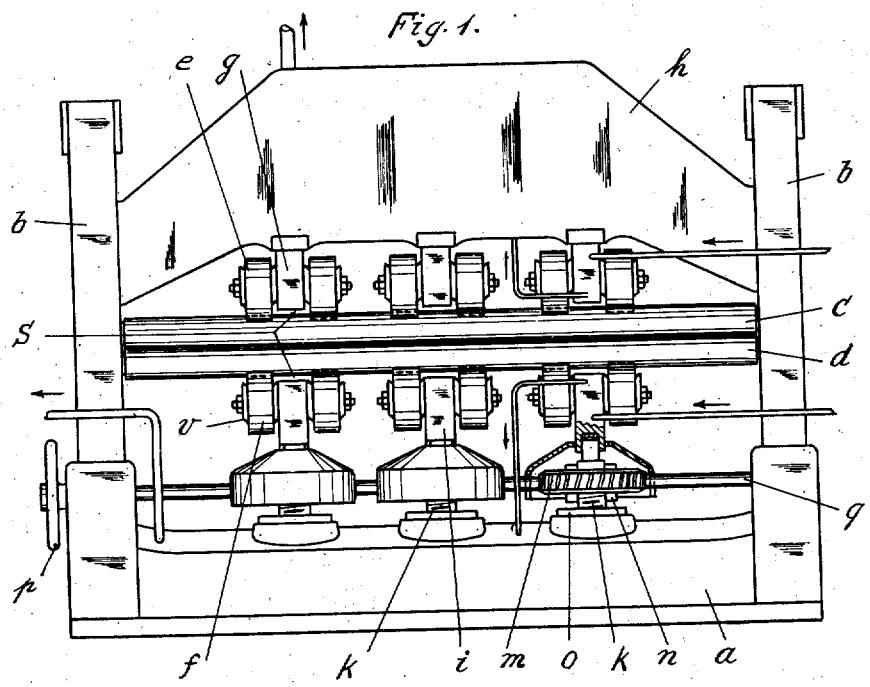
Figure 1 shows the improved straightening machine in front elevation.

The hollow base frame *a* of the plate straightening machine carries uprights *b* in which upper and lower straightening rolls *c* and *d* are directly mounted in known manner. In the first form of construction shown in Figures 1 and 2 supporting rollers *e* and *f* are arranged along both the upper and lower straightening rolls *c* and *d*, respectively. Whereas the bearing brackets *g* of the upper supporting rollers *e* are carried by a yoke *h* and thus participate in the adjusting movements of this yoke, the bearing brackets *i* of the lower supporting rollers *f* rest on separate adjusting means which, in the example illustrated, are constructed as screw spindles *k* which are turned in nuts *o* with the aid of worm gears *m*, *n*. The drive of the worms *n*, which are situated behind the worm wheels *m* in Figure 1, is effected by means of a hand wheel *p* and a continuous worm shaft *q*. According to the direction in which the hand wheel is turned, the spindles *k* are screwed into or out of the screw nuts *o* supported on the base frame *a* so that lowering or raising of the lower supporting rollers *f* takes place, which rollers are rotatably mounted on axles $f_1$ projecting, according to the invention from the two flanks of the bearing brackets *i*.

As the main point, when rolling sheets in hot condition, is stretching or lengthening of the middle section of the sheet metal plates moving between the straightening rolls *e* and *d*, a more or less great deflecting of the lower straightening rolls *d* towards the upper rolls *c* must take place according to the amount of stretching. For this purpose the adjusting means *k*, *m*, and *n* are preferably so constructed that the raising of the supporting rollers *f* corresponds to the desired curve of deflection of the lower straightening rolls *d*, that is to say, the two outer rows of supporting rollers are raised less than the middle row of supporting rollers during one and the same adjustment rotation of the hand wheel *p*. This can be attained in three different ways. The ratio of transmission of the worm gears *m*, *n* rotating the middle spindles *k* may, when the middle and outer spindles *k* have the same screw pitch, be different from those of the worm gears *m*, *n*, which rotate the outer spindles and are driven by the same shaft *q* as the worm gears *m*, *n* of the middle spindles *k*. However, if the middle and outer worm gears *m*, *n* have the same ratio of transmission, the screw pitch of the middle spindles *k* may be different from that of the outer spindles *k*. Finally, both the ratios of transmission of the middle and outer worm gears *m*, *n* and also the screw pitches of the middle and outer spindles *k* may be different. The ratios of transmission of the worm gears *m*, *n* and the screw pitches of the spindles *k* must be chosen according to the purpose for which the machine is to be employed, so that the middle lower straightening rolls *d* must be deflected to any desired amount towards the material to be straightened.

Instead of intercoupling all the adjusting means of the supporting rollers *f* in the manner above described, so that all the bearing brackets *i* perform a predetermined up and down movement at the same time during the turning of the hand wheel *p*, the adjusting means may be so constructed that each bearing bracket *i* is brought into the desired supporting position absolutely independently of the others. This may be effected, for example, by mounting each worm *n* coordinated to a bearing bracket *i* separately and loosely on the worm driving shaft *q*, these brackets being, however, provided with coupling means which enable the brackets to be coupled with the shaft $q$ as required.

As is known, the sheet metal plates, such as they run out of the rolling mill in uncut condition into the annealing furnace and thence into the hot plate straightening machine have very ragged ends. The jags and teeth are often directed upwards and downwards and can lead to serious breakdowns when the plates are passing through the straightening machine. It has been found that one or another of the teeth which pass into the spaces between the upper or lower straightening rolls, is often torn off, the flowing material passes between the straightening rolls and drops out. The removal and dropping of the torn off pieces without hindrance is particularly facilitated by the construction and arrangement of the straightening roll supporting means according to the invention.

Figure 2:
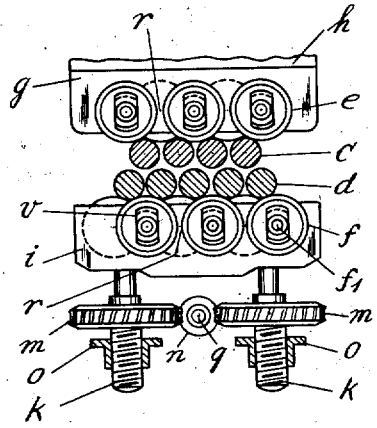
Figure 2 is a side elevation of the straightening roll supporting means of the construction shown in Figure 1, with upper and lower rows of straightening rolls in cross section.

Each supporting point of a straightening roll $c$ or $d$ comprises according to the first form of construction shown in Figures 1 and 2, two supporting rollers $e$ and $f$, respectively, which are situated one on each side of the vertical longitudinal center plane of each straightening roll $c$ or $d$, so that these straightening rolls are supported not only in upward or downward direction, but also in horizontal plane. In the straightening machine illustrated in Figure 1 each straightening roll $c$ or $d$ has, beside its two journal bearings in the uprights $b$, three supporting points, namely, two outer supporting points and one central supporting point which are formed by six supporting rollers $e$ and $f$, respectively, in all. According to the invention the two supporting rollers $e$ and $f$, respectively, coordinated to a supporting point, are not situated the one behind the other in the direction in which the plates pass through the machine, but they are mutually displaced. Thus, it is not only possible to employ supporting rollers $e$, $f$ of much larger diameter as compared with the diameters of the supporting rollers of the known plate straightening machines, so that an easy co-rotation takes place owing to increase in the turning moment of the rollers, but the distance $r$ between the succeeding rollers $e$, $f$ must be so great, that torn off scraps of sheet metal can more easily pass therebetween. As further the central axes, and consequently the journal bearings of the rollers $e$, $f$ are at a greater distance from the straightening rolls $c$ and $d$, respectively, than in the known plate straightening machines, owing to the employment of larger supporting rollers, greater distances $s$ may also be left between the bearing brackets $g$ and $i$ and the straightening rolls $c$ and $d$, respectively, so that any scraps remaining stuck in these gaps can easily be removed.

The overhanging arrangement of the axles $f_1$ of the supporting rollers $e$, $f$ on both flanks of the bearing brackets $g$ and $i$, respectively, presents the great advantage that torn off pieces of sheet metal can pass unimpeded towards the free side of the rollers and that the supporting means is directly accessible from this side, without any hindrance by bearing members, such as are provided in the double sided journal bearings for the supporting rollers in the known plate straightening machines.

Figure 3:
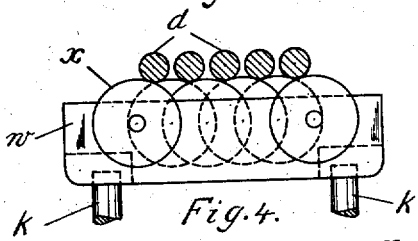
Figure 3 is a side elevation of a modified form of straightening roll supporting means with lower row of straightening rolls in cross-section.
Figure 4:
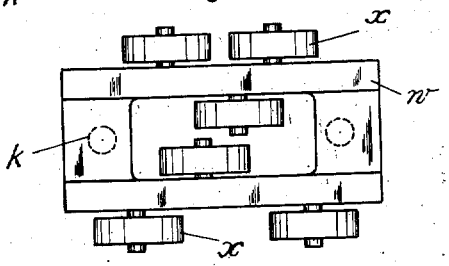
Figure 4 shows in top plan view of the straightening roll supporting means according to Figure 3.
Figure 5:
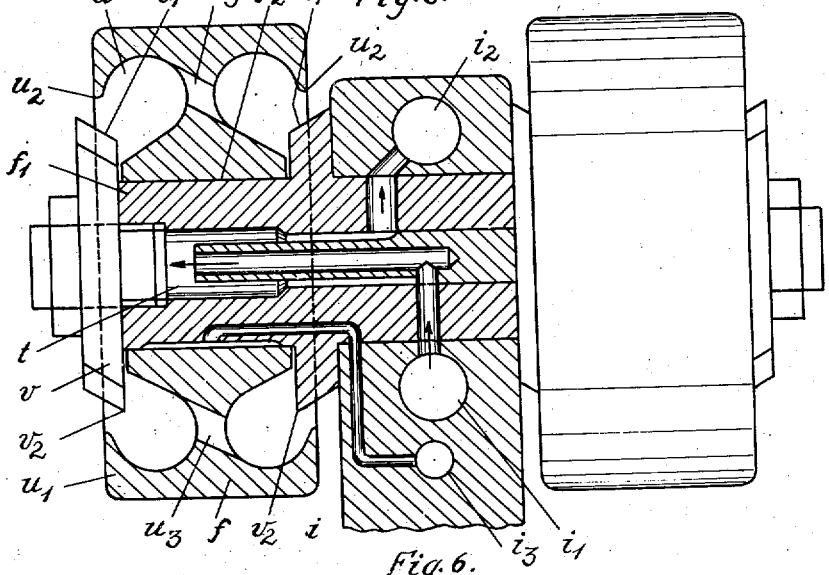
Figure 5 is a central section of a supporting roll and its journal, the supporting roller bearing bracket shown in cross-section.
Figure 6:
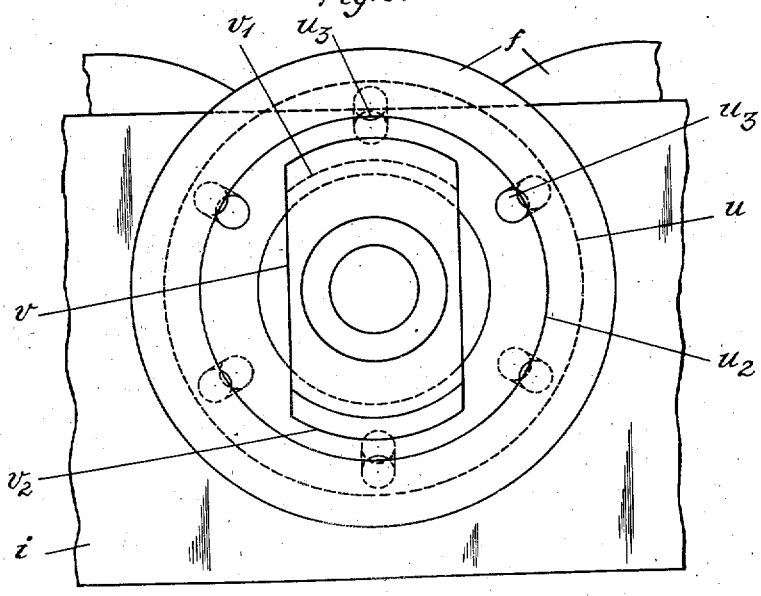
Figure 6 shows in elevation a supporting roller with a portion of the bearing bracket.

The second form of construction of the straightening roll supporting means illustrated in Figures 3 and 4 has a bearing bracket $w$, on which the supporting rollers coordinated to a supporting point of a straightening roll $d$ and arranged in pairs are not mounted the one behind the other in the direction in which the plates pass through the machine but mutually displaced. The distribution of the supporting rollers $x$ on the different flanks of the bearing bracket $w$ may be effected by employing a bracket with four flanks, so that the diameters of the supporting rollers $x$ can be chosen much larger than in the form of construction illustrated in Figures 1 and 2. Screw spindles $k$ are employed by way of example as adjusting means.

The dripping on of lubricant from the supporting rail bearings, which is extremely detrimental to the material to be straightened, is also avoided in a novel manner.

The axles $f_1$ for the supporting rollers are rigidly mounted in the bearing brackets $i$ and have a central bore $t$, in which cooling water flows during the service from and out through bores $i_1$ and $i_2$, thereby cooling the journals $f_1$ and the rollers $f$. Lubricant flows through another bore $i_3$ in the bearing bracket $i$ onto the bearing surface $f_2$ of the axle $f_1$, which lubricant, in spite of the cooling of the journal, may become very fluid under the great heat at which the hot rolling is carried out and ooze out of the roller bearing. In order to prevent the drops produced in this manner from dripping onto the material being straightened, the surfaces of the roller bearing are made narrower than the ring of supporting roller and catching grooves $u$ are provided, one on each side of each of the rollers $e$ and $f$, from which the oil drops cannot escape because the grooves are partly closed on the outer side by flanges $u_1$. The provision of the grooves is facilitated by the considerably greater diameter of the supporting rollers. In order to prevent drops of oil caught in the grooves $u_1$ and rotating with the rollers from dripping off the edge $u_2$ of the flange during the rotation of the rollers $e$ and $f$, plates $v$ each provided with an inclined drip catching surface $v_1$ extending into one of the grooves and terminating in a dripping edge $v_2$ are provided. This surface catches any drops dripping from the flange edge $u_2$ and conducts them either to the axle $f_1$ or back into the catching groove $u$ until the drops are evaporated or burned. To enable any residues from combustion and other dirt to be easily blown out of the grooves $u$ with compressed air, these grooves are interconnected within the rollers $e$, $f$ by passages $u_3$ which extend at an incline to the central axis of the rollers and lead alternately to the bottoms of the two grooves.

By the arrangement of the cooling and lubricating conduits in the interior of the bearing brackets and journals, torn off pieces of sheet metal passing between the supporting rolls are prevented from damaging the water and oil conduits situated at this point as in known straightening machines.

The cooling water entering the bearing brackets $i$ flows, as indicated by the arrows in Figure 1, into the hollow base frame $a$ and the machine yoke $h$, respectively, so that these elements are cooled and the whole machine is maintained at an approximately uniform temperature when running, so that jamming and binding caused by differences of temperature is prevented in the adjustable mechanical parts.

While I have shown and described several specific embodiments of my invention, it will be understood that I do not wish to be limited exactly thereto, since various modifications may be made without departing from the scope of my invention, as defined in the following claims.

I claim:

1. In a plate and sheet straightening machine including straightening rolls, supporting roller units for said straightening rolls, means for simultaneously adjusting said supporting roller units during the operation of said machine to move said straightening rolls to the position required to straighten the material fed through said machine, said adjusting means including a movable element and mechanism for transmitting movement from said element to said supporting roller units for moving one of said supporting roller units at a greater speed than other supporting roller units to obtain a greater working pressure on said straightening rolls at one point than at other points along the straightening roll working area.

2. In a plate and sheet straightening machine including straightening rolls, supporting roller units for said straightening rolls, said supporting rollers having a diameter greater than the diameter of said straightening rolls and positioned and arranged in staggered relation on each side of the central vertical plane of said straightening rolls to support said straightening rolls in all directions and means for simultaneously adjusting said supporting roller units, said adjusting means including an element and mechanism connecting said element to said supporting roller units for moving one of said supporting roller units at a greater speed than the other supporting roller units in passing into supporting position.

3. In a plate straightening machine including straightening rolls, supporting roller units for supporting and flexing said straightening rolls, some of said supporting roller units being movable vertically relative to the other units during the operation of the machine, means for moving said supporting roller units, said units comprising a support having shafts extending from each side thereof with the shafts on one side in staggered relation with the shafts extending from the other side of said support, and supporting rollers detachably mounted for rotation on said shafts.

4. In a plate straightening machine including straightening rolls, a supporting roller unit movable toward and away from said straightening rolls during the operation of the machine to control the straightening roll curvature necessary to straighten the material being fed through said machine, means for moving said supporting roller unit, said unit comprising a support having shafts extending from each side thereof with the shafts on one side in staggered relation with the shafts extending from the other side of said support, and supporting rollers detachably mounted for rotation on said shafts.

FRITZ UNGERER.